United States Patent [19]
Texidor et al.

[11] 4,257,389
[45] Mar. 24, 1981

[54] HUMIDIFIER

[76] Inventors: Julio Texidor, 130 Kenilworth, Elk Grove Village, Ill. 60007; Arthur M. Krause, 2318 W. Justen Rd., McHenry, Ill. 60050; Patricio Texidor, 214 E. Highland, Mt. Prospect, Ill. 60056

[21] Appl. No.: 8,682

[22] Filed: Feb. 1, 1979

[51] Int. Cl.³ .................. F24F 3/14; F02M 15/00
[52] U.S. Cl. .................... 126/113; 165/179; 165/184; 261/129; 261/DIG. 15; 261/DIG. 46
[58] Field of Search ............... 126/113, 134; 261/129, 261/130, DIG. 15, DIG. 46; 165/179, 184; 137/101.19, 499

[56] References Cited

U.S. PATENT DOCUMENTS

| | | | |
|---|---|---|---|
| 1,832,769 | 11/1931 | Graham | 165/184 |
| 2,037,575 | 4/1936 | Hamilton et al. | 137/499 |
| 2,076,600 | 4/1937 | Smith | 137/499 |
| 2,163,592 | 6/1939 | Dickey | 137/101.19 |
| 2,458,064 | 1/1949 | DiPetta | 126/113 |
| 2,512,695 | 6/1950 | Stout et al. | 137/499 |
| 2,554,867 | 5/1951 | Mills | 261/DIG. 15 |
| 2,560,006 | 7/1951 | Snyder | 126/113 |
| 3,240,205 | 3/1966 | Helland | 126/113 |
| 3,263,673 | 8/1966 | Molzhon | 126/113 |
| 3,280,851 | 10/1966 | Habdas | 165/184 |
| 3,294,081 | 12/1966 | Zach | 126/113 |
| 3,443,559 | 5/1969 | Pollick | 126/113 |
| 3,523,175 | 8/1970 | Gygax | 126/113 |
| 3,525,236 | 8/1970 | Solhkhah | 165/184 |
| 3,730,229 | 5/1973 | D'Onofrio | 165/184 |
| 3,952,181 | 4/1976 | Reed | 126/113 |
| 3,990,427 | 11/1976 | Clinebell | 126/113 |
| 4,054,122 | 10/1977 | Reed | 126/113 |

Primary Examiner—James C. Yeung
Assistant Examiner—Daniel O'Connor
Attorney, Agent, or Firm—Neuman, Williams, Anderson & Olson

[57] ABSTRACT

A humidifier is disclosed for use with a forced air furnace in which water flowing in a coiled tube disposed in the exhaust path for waste gas from the combustion chamber is vaporized by heat transfer from the waste gas and transferred in admixture with unvaporized water into a container in the warm air duct of the furnace. The steam humidifies the air while the unvaporized water is separated and returned to the exhaust path of the combustion chamber where it in turn is vaporized and vented to the atmosphere. The heat transfer to the water in the coiled tube is enhanced by a convoluted configuration of the tubing which induces turbulence in the waste gas and/or water. The humidifier is regulated by controls which are response to the flow of air through the furnace as well as to the humidity.

9 Claims, 3 Drawing Figures

HUMIDIFIER

BACKGROUND OF THE INVENTION

1. Field of the Invention

This invention relates to static humidifiers in general and more particularly to a humidifier system which uses the heat of waste gas from a forced air furnace to produce steam.

2. Description of the Prior Art

It is often desirable to provide and maintain a predetermined humidity level by means of a humidifier incorporated into the forced air heating system. Static water pan humidifiers have failed to generate sufficient humidity for dry weather regions, while power driven humidifiers have usually required an additional electrical power source. For economy and efficiency, it is highly desirable to utilize the existing furnace components without extensive or expensive modification. It is known, for example, that one can use the heat of waste combustion gas from a gas or oil furnace to produce steam in a humidifier system. Reed U.S. Pat. No. 4,054,122 discloses such a system. However, systems of this type do not efficiently utilize the steam generation capacity of the waste combustion gas or the steam generated thereby. The Reed humidifier system, for example, employs a coil formed from plain tubing which is disposed in the waste gas exhaust duct of a gas furnace and in which steam is generated. Such a conventional coil does not promote enhanced heat transfer from the combustion gas to the water and thus requires that a substantial length of the tubing be maintained in the exhaust duct in order to achieve the required steam generation for adequate humidity in the living space. Efficient heat transfer requires that the coil tube be surrounded by the hottest gas which has been found in different locations of the flue pipe depending on the shape and angle of the flue pipe.

In addition, the prior humidifiers of this type have typically utilized a drip chamber positioned outside the ductwork of the furnace system, and hence apparently at about ambient temperature, for separating unvaporized water and sediment from the steam for use in regulating the humidity. The unvaporized water and sediment are collected in a lower portion of the separation zone whereas the steam passes through the upper portion of the zone. Being substantially cooler than the steam, the separation zone would tend to cool the steam passing through it and to promote condensation of the steam in the zone. The humidifier system of the present invention overcomes the drawbacks and deficiencies of these prior systems to create the desired humidity in an efficient and economical manner by enhancing the efficiency of the transfer of heat from the waste combustion gas from a gas or oil furnace to the water and of the transfer of steam to the air flow system of the furnace as well as transfer of heat from the water vapor to the air.

OBJECTS OF THE INVENTION

It is therefore a general object of the invention to provide an improved humidifier to solve the aforementioned problems.

More specifically, it is an object of this invention to provide a humidifier for use with a gas or oil furnace which utilizes with improved efficiency the transfer of heat from the waste gas from the furnace to liquid water to generate steam.

Similarly, an object of the present invention is to provide a humidifier for use with a gas or oil furnace which permits efficient utilization of the steam generated in regulating the humidity in heated air generated by the furnace.

A secondary object is the transfer of heat, inherent in the steam, from the flue to mix with the less hot air in the plenum thus giving a net heat gain in the hot air ducts and reducing the demand on the furnace.

It is another object of the invention to provide a steam generating humidifying system which can be adapted to existing furnace components with a minimum of effort and expense. It is a related object of the invention to provide such a system with a minimum of moving parts so as to minimize the likelihood of failure due to wear.

SUMMARY OF THE INVENTION

These objects are achieved by an improved humidifier for use in conjunction with a conventional hot gas or oil furnace having an air flow system including a cool air return duct and a warm air duct and having an exhaust path for heated waste gas from the combustion chamber. The humidifier provides for the generation of steam in a coiled tube disposed in the exhaust path by heat transfer from the waste gas to liquid water in the coil. Heat transfer is enhanced in the exhaust path by the turbulence-inducing configuration of the tubing employed. The humidifier of this invention also provides for the introduction of liquid water into the coil, the control of its flow rate thereinto, the discharge of a mixture of steam and unvaporized water from the coil into the warm air duct, the separation and collection in the warm air duct of the unvaporized water and the disposal of such water through the drain tube to a sewer, container or re-evaporation coil.

BRIEF DESCRIPTION OF THE DRAWINGS

For a more complete understanding of this invention reference should now be made to the embodiment illustrated in greater detail in the accompanying drawings and described below by way of examples of the invention. In the drawings.

It should be understood that the drawings are not necessarily to scale and that the embodiment is sometimes illustrated by graphic symbols, phantom lines, diagrammatic representations and fragmentary views. In certain instances, details which are not necessary for an understanding of the present invention or which render other details difficult to perceive have been omitted. It should be understood, of course, that the invention is not necessarily limited to the particular embodiments illustrated herein.

DETAILED DESCRIPTION OF THE DRAWINGS INCLUDING PREFERRED EMBODIMENTS

Figure 1:
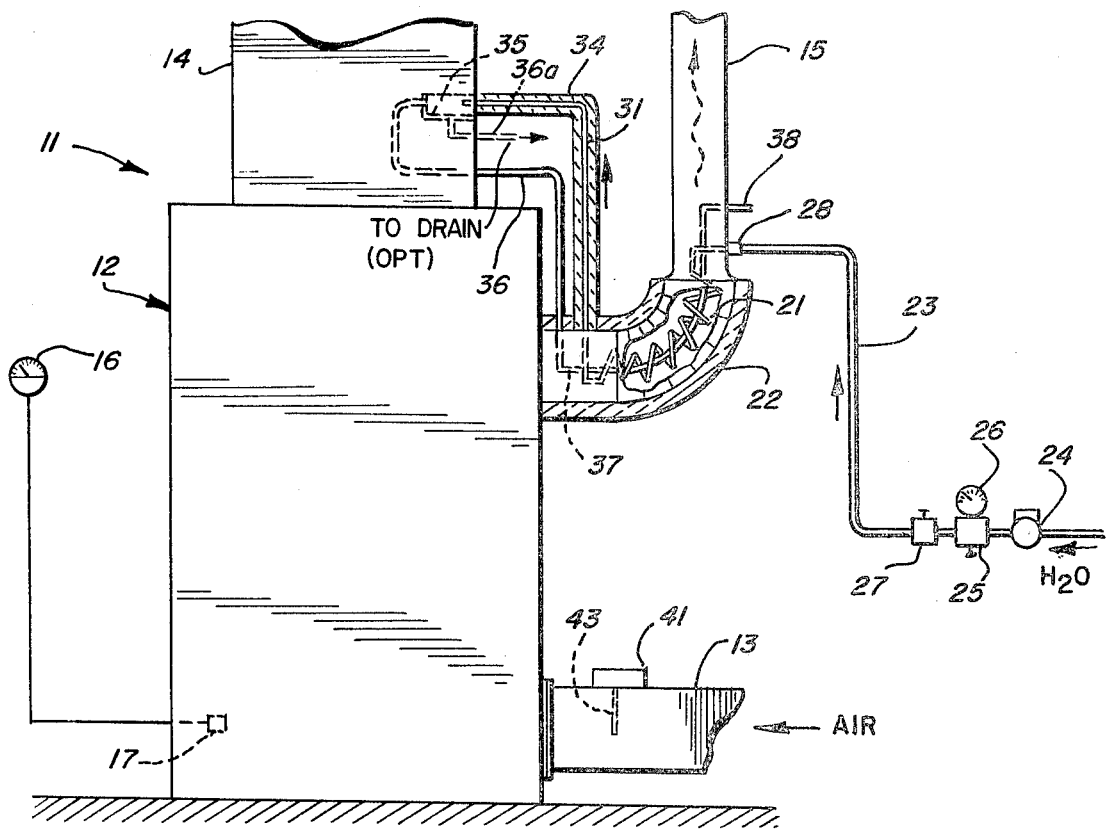
FIG. 1 is a fragmentary view partially in block form of one embodiment of the flow system of the humidifier of this invention in combination with a conventional forced air furnace system partially cut away to illustrate the water evaporation coil of the humidifier disposed in the heated waste combustion gas exhaust flue of the combustion chamber.
Figure 3:
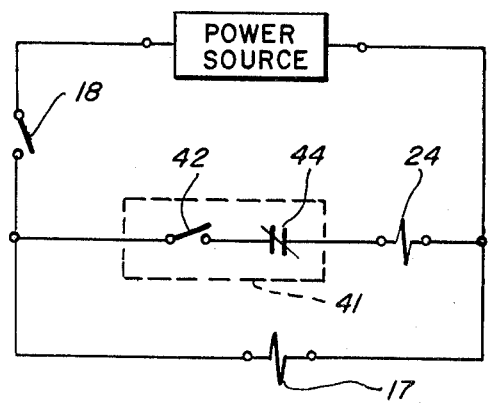
FIG. 3 is a schematic diagram of the electrical system controlling the introduction of water into the coil of FIG. 1.

Turning first to FIGS. 1 and 3 together there is shown a conventional upright gas furnace system having a furnace housing 12, cool air return duct 13, a warm air duct including a plenum 14 and an exhaust flow path including exhaust duct 15. Not shown but disposed within the furnace housing 12 are a conventional motor-driven blower system and combustion chamber including a burner unit, a source of combustion gas, oil or other fuels, a draft leading heated waste combustion gas from the combustion chamber to the exhaust duct 15 and ducts for directing air from the cool air return 13 through the furnace housing 12, into communication with the combustion chamber and then into the plenum chamber 14. A manually adjustable thermostat 16 mounted in the area to be heated at a point remote from the furnace senses the temperature of the air and activates the blower and a gas valve 17 which controls the flow of fuel to the burner.

In operation, when the air temperature falls below a predetermined level, the contacts 18 of the thermostat 16 close, signalling a demand for heat and energizing the gas valve 17 to initiate a flow of combustion gas into the burner system. Heated spent combustion gas passes from the combustion chamber into the exhaust duct 15 which vents the waste gas to the atmosphere. When the combustion chamber reaches a predetermined temperature, a thermostat (not shown) in the furnace triggers the blower system. The blower causes a flow of air from the cool air return 13 through the furnace housing 12 and into the plenum 14 from which the heated air is directed through a duct or ducts into its intended destination.

Figure 2:
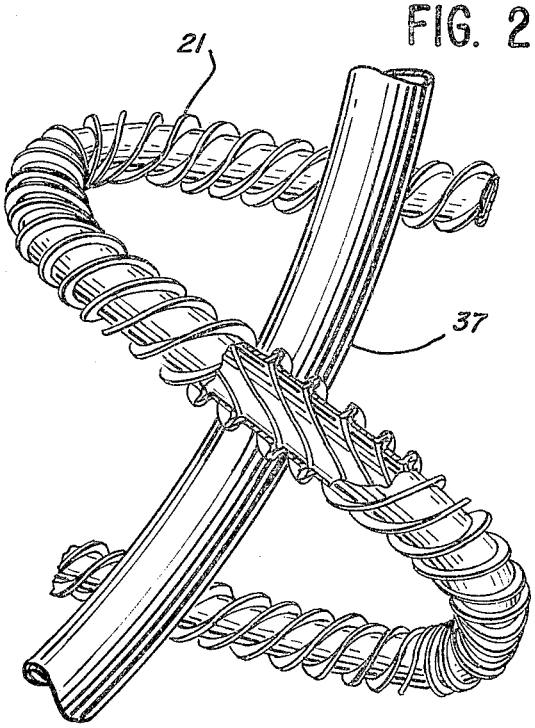
FIG. 2 is an enlarged view of the primary evaporation coil shown in FIG. 1 with the coil partially cut away to reveal the cross section of the convoluted tubing of the coil.

Referring now to FIGS. 1 and 2, a coiled conduit 21 is disposed in the exhaust duct 15. Liquid water is introduced into and flows in the coiled conduit 21 under conditions to be described in detail hereinafter. As the furnace becomes hot, the temperature of the waste gas in the exhaust duct 15 in the region of the coiled conduit 21 rises to a level where heat transfer from the waste gas to the coiled conduit 21 causes liquid water flowing in the coiled conduit 21 to vaporize to steam.

The coiled conduit 21 is formed of spirally flute tubing whose configuration is shown more clearly in FIG. 2. The spirally fluted configuration creates turbulence both in the waste gas at the outer tube wall and in the water at the inner tube wall, thus bringing greatly increased volumes of waste gas and water to the outer and inner tube walls, respectively, and allowing heat exchange to occur in far less time and in considerably shorter tube lengths than with tubing having a plain configuration. As a result of this internal and external turbulence as well as a moderate surface area enhancement, the coiled conduit 21 permits up to 4 times as many BTU's to be transferred per foot, relative to smooth tubes having a comparable thickness as the convoluted tubing 21. Thus shorter lengths of the conduit 21 are required, relative to such comparable smooth conduits, to achieve the same amount of steam generation, lessening the obstacle presented by the coil 21 to the free flow of waste gas from the furnace in the exhaust duct 15. A 10-foot length of copper convolluted tube type CDA122, manufactured by Spiral Tubing Corporation, with an outside diameter of 0.5 inches and a metal thickness of 0.025 inches has been used for the conduit 21 with particular success. After travelling this length the material being discharged from the coiled tubing 21 is primarily steam but also includes unvaporized water. Dislodged sediment and precipitated minerals collect in the drip pan 35.

The coiled segment of conduit 21 is generally coaxial with the exhaust duct 15. The exhaust duct 15 may vary in size, but generally it has an inside diameter of about 5 inches which is expanded to about 6 inches for the portion thereof around the conduit 21 to compensate for the volume occupied by the coil and further reduce any restriction to free flow of the waste gas in the exhaust duct 15. The turns of the coil extend across about ⅔ of the inside diameter of the exhaust duct 15 and thus across about 4 inches of the diameter of the 6-inch inside diameter of the duct 15. A layer of insulation 22 around the exhaust duct 15 in the vicinity of the conduit 21 provides maximum heat retention in the duct 15 and thereby facilitates maximum heat transfer to the conduit 21.

Means for introducing and regulating the pressure and volume flow rate of water in the liquid state to the coiled conduit 21 include a feed line 23, a solenoid valve 24, an adjustable pressure regulator 25 with a gauge 26 and an adjustable needle valve 27. The feed line 23 directs water from a convenient source to the conduit 21 and is connected to the conduit 21 by means of a suitable bushing, for example a brass fitting 28. Line 23 is typically 0.250 or 0.375 inch O.D. smooth copper or plastic tubing. Water from any suitable source, for example a standard water line, can be used. Preferably the water is treated in a water softener before entering the feed line 23 to reduce the amount of sediment formation upon steam generation.

The solenoid valve 24 is normally closed to prevent water from entering the conduit 21 but upon activation opens to permit water to flow through the feed line 23 into the conduit 21. Activation of the solenoid valve 24 will be discussed in detail hereinafter. A suitable solenoid valve 24 is the 24 volt a.c. 60 Hz. Model US826074 manufactured by Automatic Switch Company.

The pressure regulator 25 permits a predetermined constant pressure of liquid water to be maintained at the inlet of the conduit 21. Generally, a wide range of pressures are suitable and a pressure in the range of 15 to 20 pounds per square inch gauge has been used particularly successfully. This represents a substantial reduction from the standard water line pressure of about 80 pounds per square inch gauge. A suitable pressure regulator is the Model RO3-02-1100 manufactured by Wilkerson.

The needle valve 27 permits precise control of the volume flow rate of water into the conduit 21. A suitable needle valve is the Pneu-Trol manufactured by DELTROL. Control of the volume flow rate of water into the conduit 21 is established precisely when the system is installed. Typically water enters the conduit 21 at a rate of about 1-1/8 gallons per hour.

The steam and any unvaporized water and solid sediment discharged from the conduit 21 passes through the delivery tube 31 to a point in the warm air duct, for example, the plenum chamber 14. The delivery tube 31 is attached at its ends to the coiled conduit 21 and the plenum 14 and is surrounded by a layer of high-temperature insulation 34 to minimize any condensation therein. Smooth copper tubing in the range of 0.25 to 0.5 inch O.D. has been found effective for the tube 31. Similarly dimensioned non-metallic tubes could be used.

Upon entering the plenum, the unvaporized water separates from the steam. Suitable means for performing this separation include a drip pan 35. While the pan 35 poses no obstacle to the immediate entry of the steam into the stream of heated air flowing upward, the unvaporized water and sediment spatter against the inside walls and inside bottom surface of the drip pan 35 and are collected therein. The drip pan 35 being located within a short distance, generally about a foot, above the furnace and in the path of the heated air generally has a temperature of about 200° F. when the furnace is hot. Thus the drip pan does not promote the condensation of steam entering the plenum 14 from the delivery tube 31 or decrease the efficient utilization of generated steam to increase the humidity and add heat. A pan which is 4 inches long, 3 inches wide and 2 inches deep is generally used.

A 0.375-inch diameter drainage tube 36 conducts liquid water from the pan 35 to a tube 37 having an outlet 38. Drain 36 is preferably connected to the side of the drip pan 35 approximately ½ inch above the bottom of the drip pan so that sediment carried into the combustion chamber within the water from the coil settles into the bottom of the drip pan 35. As such, the water flowing to the re-evaporation tube 37 has substantially less mineral solids to clog the tubing. Where the water is unusually hard (in excess of 6 grains hardness), it is preferable to drain the drip pan 35 without passing the water overflow through the re-evaporation tube 37. In such case, the water may be conducted directly from the drip pan 35 to a drain through the drainage tube 36a shown in FIG. 1 in broken lines. In either event, the drip pan 35 serves as an open reservoir from which additional evaporation into the plenum atmosphere can take place.

Referring now to FIGS. 1 and 3, the mechanism for opening and closing the solenoid valve 24 includes devices for sensing the relative humidity and the flow of air through the furnace air flow system. Suitable devices of this type are included in a manually adjustable humidistat and a sail switch 41 assembly. Upon activation of the humidistat (not shown in detail) its contacts 44 close, signalling a demand for humidity. The sail switch assembly 41 is shown positioned in the cool air return duct 13 but could be elsewhere in the ductwork. When a stream of air is generated by the blower system, the projecting plate 43 of the sail switch 41 is moved to a forward position by the stream of air, thereby closing a contact 42. Thus, the solenoid valve 24 is triggered by the operation of the blower without requiring modification of the electrical system of the blower. Both the humidistat and sail switch 41 can be conveniently mounted in the same unit as shown. If either the humidistat contacts 44 or sail switch contact 42 is not closed, the solenoid valve 24 cannot open to permit water to flow into the coiled conduit 21.

This control is necessary because only when the furnace is in operation is sufficient heat available from the waste combustion gas in the exhaust duct 15 to generate steam in the coiled tubing 21. Thus, even if the humidity has fallen below the predetermined level and the blower is in operation, the solenoid valve 24 will not open unless the furnace is moving air.

In a typical operating cycle, the contact 18 of the thermostat 16 closes, the gas valve 17 is opened, permitting combustion gas to flow to the burners for ignition by the pilot or starter system. As the temperature of the combustion chamber rises to a predetermined level, the blower system automatically becomes operative. Cool air is then drawn through the return duct 13 into the furnace housing 12 into communication with the walls of the combustion chamber and is forced upward through the plenum 14. As the temperature of the furnace rises, the temperature of air entering the plenum 14 also rises. The hot waste combustion gas exits the furnace through the exhaust duct 15. The temperature in the exhaust duct rises and becomes sufficient to generate steam from liquid water, thereby defining in the exhaust duct 15 a steam generation zone.

When the furnace is in operation and when the humidistat indicates that the humidity has dropped below a predetermined level and the sail switch contact 42 is closed to indicate that air is flowing in the furnace system, a signal is applied to the solenoid valve 24, which opens to permit liquid water to flow into the coiled conduit 21. The water flows at a pressure and volume flow rate determined by the settings of the pressure regulator 25 and needle valve 27. Any liquid water which flows through the coiled conduit 21 before the temperature of waste combustion gas in the exhaust duct 15 is high enough to convert the liquid water to steam is prevented from entering the stream of air in the plenum 14 by the pan 35 and is led by the drainage tube 36 to the drain outlet 38 where it discharges to the atmosphere.

With continued operation of the furnace the temperature in the exhaust duct 15 increases and steam is generated in the coiled tubing 21. This steam is fed to the stream of air in the plenum 14 with unevaporated purging water, as described above. The humidified air is then transmitted to its intended destination by one or more heating ducts normally used in carrying heated air from the furnace.

When the humidity reaches a predetermined level, the humidistat is deactivated, closing the solenoid valve 24. The supply of water to the coiled tubing 21 is thus cut off. Further, when the room temperature reaches a predetermined level, the thermostat contacts 18 open, closing the gas valve 17 and removing power from the solenoid valve 24. As an optional feature, the deactivation of the valve 24 in response to the thermostat may be delayed by a conventional delay circuit (not shown). This delay will maintain the valve 24 in an open condition for a preset period of time, generally a few minutes, following the shut down of the gas valve 17. Because the solenoid valve 24 is open, liquid water continues to flow into the coiled tubing 21 to cool the tubing 21 and to flush sediment out of the tubing 21. This preset period of time serves as a rinse cycle. The blower continues in operation until the temperature in the combustion chamber falls below a certain level, thereby utilizing the residual furnace heat to provide heated air.

The humidifier of this invention can also be used in conjunction with an oil furnace. In that case, the thermostat would trigger the supply of oil, instead of gas, to the burner and the waste gas would be a combustion product of the oil. For the purpose of this application, "waste gas" shall include the combustion product of the fuel whether it be gas or oil.

Other options and alternatives may be employed within the scope of the present invention. For example, an auxiliary water softener may be incorporated in the water line in advance of the solenoid valve. Miniature softener units utilizing salt tablets and/or water filters such as iron, sand, etc., are particularly suitable for this purpose.

As another alternative, the primary evaporation coil 21 may be designed to extend into the combustion chamber from the exhaust flue. The greater temperatures available within the furnace proper boils the water faster than in the exhaust flue evaporator shown herein. The drainage tube 36 could also be disposed in the combustion chamber. In such case the exhaust duct 15 would not have to be insulated.

From the above description it is apparent that the objects of the present invention have been achieved. While only certain embodiments have been set forth, alternative embodiments and various modifications will be apparent from the above description to those skilled in the art and are considered equivalents and within the spirit and scope of the present embodiment.

Having described the invention, what is claimed is:

1. For use with a forced air furnace having an exhaust flow path for heated waste combustion gas, and having an air flow system including a cool air return duct and a warm air duct, a humidifying system comprising:
    a coiled conduit disposed in the exhaust flow path for directing water through the exhaust flow path wherein at least a portion of the liquid water is vaporized into steam by the transfer of heat from the heated waste combustion gas to the liquid water, said coiled conduit being formed of tubing having rib means thereon for inducing turbulence in the waste gas and a spirally recessed internal surface for inducing turbulence in the water to thereby enhance the efficiency of heat transfer to the liquid water and to dislodge sediment from within said tubing;
    means for introducing liquid water into said coiled conduit;
    flow control means including a pressure regulating means and valve means for controlling the volume flow rate of liquid water introduced into said coiled conduit such that at least a portion of said water passing through said conduit remains unvaporized during each operating cycle;
    means for discharging a mixture of steam and unvaporized water from said coiled conduit into the warm air duct;
    drip collector means in the warm air duct for separating and collecting unvaporized water entering the warm air duct from said coiled conduit; and
    means for removing the collected unvaporized water and said dislodged sediment from the warm air duct.

2. The humidifying system of claim 1 wherein said coiled conduit is spirally fluted to induce turbulence on the inner and outer walls of said tubing.

3. The humidifying system of claim 1 wherein said introducing means include a first control for said valve responsive to the flow of air through the air flow system of the furnace.

4. The humidifying system of claim 3 wherein said first control includes a sail switch in the cool air return duct responsive to the flow of air.

5. The humidifying system of claim 1 wherein said introducing means include a second control for said valve responsive to the humidity.

6. The humidifying system of claim 1 wherein said valve means is a needle valve.

7. The humidifying system of claim 1 wherein said drip pan is at an elevated temperature and has a top opening substantially larger than the cross-sectional area of said tubing to prevent condensation in the drip pan of the steam entering the warm air duct.

8. The humidifying system of claim 1 wherein said removing means include means for redirecting the collected unvaporized water from the warm air duct through the exhaust flow path wherein at least a portion of such water is vaporized to steam by the transfer of heat from the heated waste combustion gas to the water and from which the steam is vented to the atmosphere.

9. In a humidifier system for use with a forced air furnace having an exhaust path for heated waste gas, the humidifier system being of the type which utilizes an evaporating conduit located in the said exhaust path for boiling water to generate steam to be introduced to the forced air, the improvement comprising a conduit of spirally fluted tubing located in said exhaust path and acting as said evaporating conduit, said tubing having external spiral projections emanating into the exhaust path for creating turbulence in the waste gas and enhancing the heat transfer from the waste gas to the water, said spirally fluted tubing further having spiral recesses formed along its inside walls for creating turbulence in the water flowing through said tubing to enhance the heat transfer from the exhaust gas to the water and to dislodge sediment from said tubing, said improvement further comprising pressure regulating means and valve means for controlling the flow rate through said conduit such that at least a portion of the water during each cycle remains in the unvaporized state to carry said dislodged sediment from said tubing and means for removing said unvaporized water and sediment from said furnace and means for recirculating said unvaporized water through the exhaust path.

* * * * *